Jan. 11, 1938. R. SAULNIER 2,105,374
TAIL DEVICE FOR AIRPLANES
Filed Nov. 7, 1936 2 Sheets-Sheet 1

R. Saulnier, Inventor
By: Glascock, Downing & Seebold
Attys.

Jan. 11, 1938.  R. SAULNIER  2,105,374
TAIL DEVICE FOR AIRPLANES
Filed Nov. 7, 1936  2 Sheets-Sheet 2
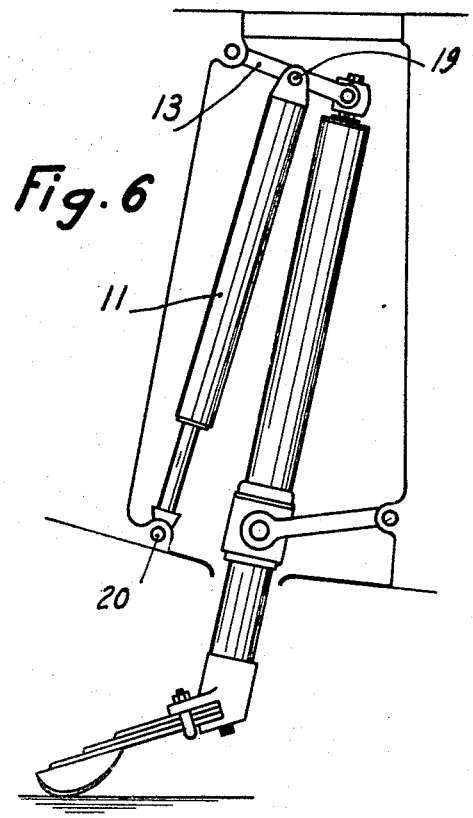
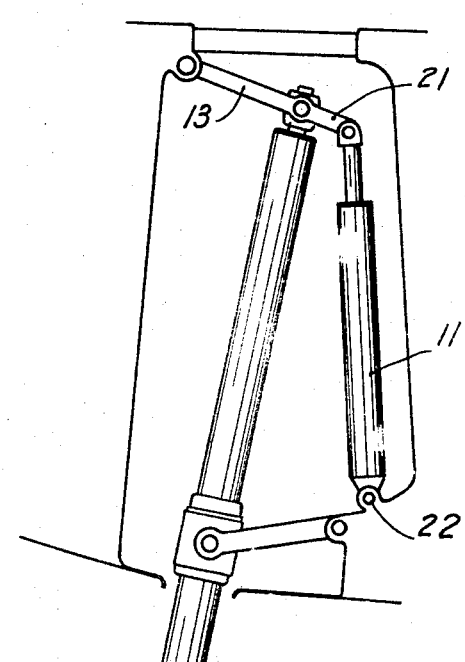
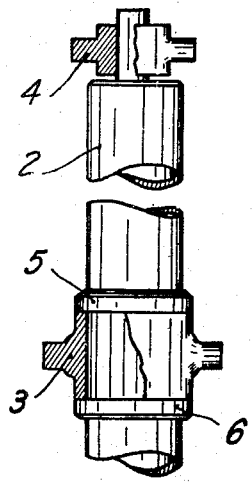
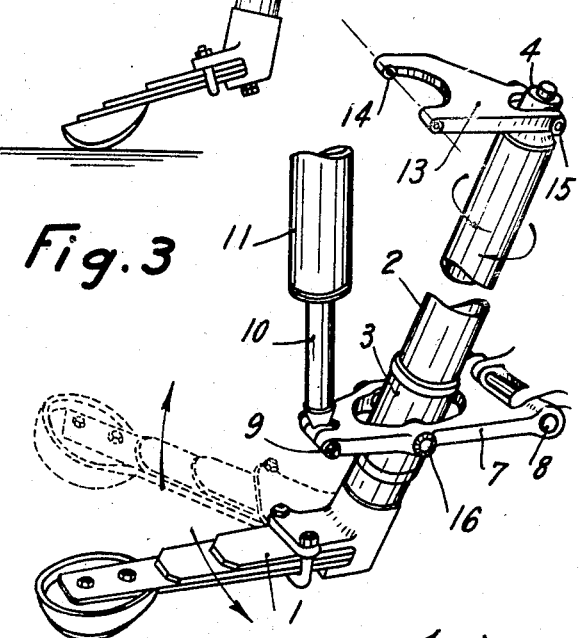
R. Saulnier, Inventor
By Glascock Downing & Seebold, Attys.

Patented Jan. 11, 1938

2,105,374

UNITED STATES PATENT OFFICE 2,105,374

TAIL DEVICE FOR AIRPLANES

Raymond Saulnier, Paris, France

Application November 7, 1936, Serial No. 109,779
In France November 9, 1935

4 Claims. (Cl. 244—109)

The present invention relates to tail wheels or tail skids for airplanes and more especially devices of this kind in which the skid or wheel is mounted on a tube which is adapted to turn without sliding in two collars connected to the body of the airplane by means of levers.

In known devices of this kind, the levers form a single rigid structure adapted to pivot about one axis carried by the body of the airplane. It follows that, when the levers oscillate, the angular position of the tube that carries the skid or the wheel varies very much with respect to the body of the airplane, and, consequently, with respect to the ground, which is a very serious drawback when the airplane is rolling on the ground, for instance taxiing.

The object of the present invention is to provide a tail skid or wheel which obviates this drawback.

According to the essential feature of the present invention, the levers that carry the tube with respect to the body of the airplane are pivoted independently of each other at different respective points, these points being located on opposite sides of the tube. Owing to this arrangement, when the levers oscillate, the tube that carries the skid or wheel moves parallelly to itself so that its angular position with respect to the body of the airplane, and therefore to the ground, varies but to a negligible degree. In a likewise manner, the component perpendicular to the axis of the tube of the movements of the tube parallelly to itself is so small, in the case of the device according to the present invention that it is possible to make the aperture through which the tube projects outwardly from the inside of the fuselage toward the ground a very small size. Such an arrangement reduces the penetration of mud and dust into the tail of the airplane, where are located the bearings and the axes of the levers.

Other features and advantages of the present invention will result from the following detailed description of some specific embodiments thereof.

Preferred embodiments of the present invention will be hereinafter described, with reference to the accompanying drawings, given merely by way of example, and in which:

Fig. 3 is a corresponding perspective view;

Fig. 5 is a section of a portion of the pivoting tube carrying the skid or wheel of the device, and also of the collars in which said tube is mounted;

Figs. 6 and 7 show two modifications in which the shock absorber is arranged in a different manner.

Figure 1:
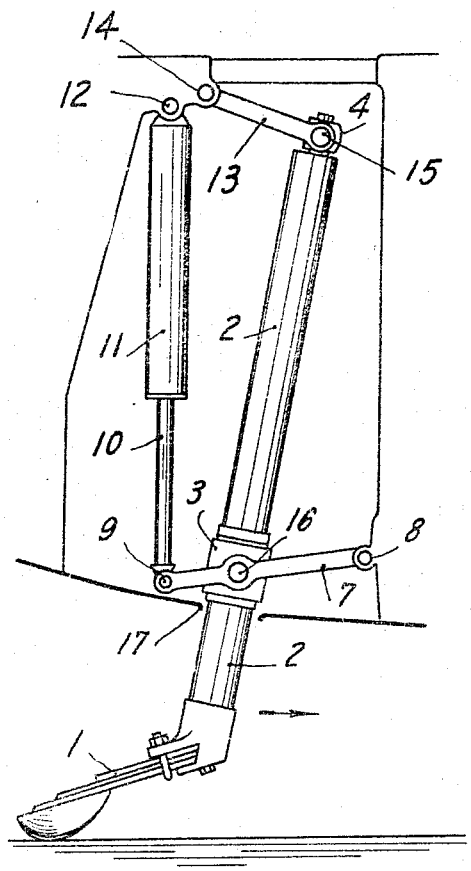
Fig. 1 is a diagrammatical view of a tail skid according to the present invention.

In the drawings, I have shown at 1 a skid or runner carried by a pivoting tube 2, mounted in two collars 3 and 4. Collar 3, in which the tube can turn freely, without however being allowed to slide owing to the provision of thrust bearings 5 and 6, is carried by an arm 7, pivoted at its end about a fixed axis 8, located ahead of the skid.

The other end 9 of this arm 7 is pivoted to the rod 10 of a shock absorber 11.

The upper end of this shock absorber is pivoted about an axis 12.

Figure 2:
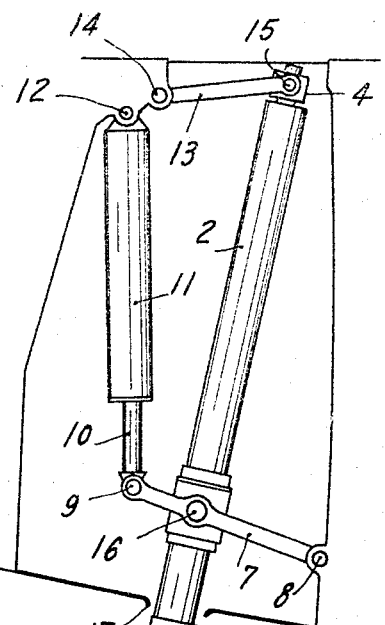
Fig. 2 is a similar view showing the parts in a different relative position.

The second collar, 4, is carried by an arm 13 the other end of which is pivoted about an axis 14, located on the rear of the tube. Points 15 and 16 thus move along circumferential arcs the centers of which are located on axes 14 and 8, respectively, when the tube moves upwardly (Fig. 2) or downwardly. The angle made by said tube with the vertical direction therefore changes but very little in the course of this displacement. As a result of this arrangement, it is possible, in particular, to provide, in the tail of the airplane, an opening for the tube which is very small, as shown at 17. The shock absorber 11 is thus placed in a space which is nearly wholly closed and is thus well protected against dust and dirt.

As it is more clearly visible in Fig. 3, the skid 1, or the wheel, may turn freely in the desired direction without influencing the shock absorber the operation of which is, as above stated, wholly independent of the direction of the skid or wheel in question.

Figure 4:
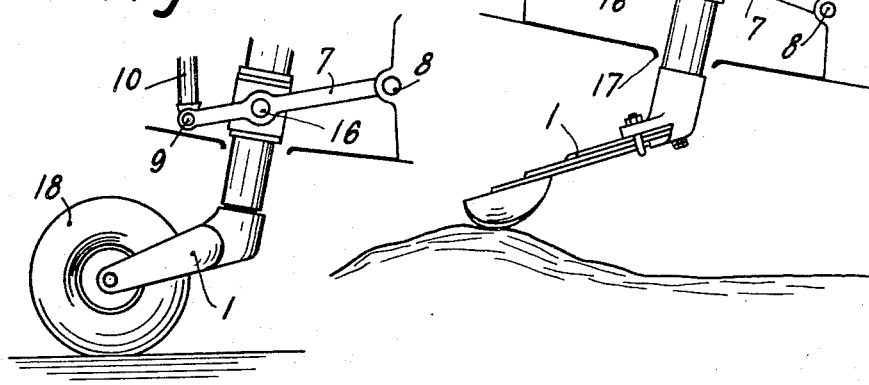
Fig. 4 is a detail view of a tail wheel according to the invention.

In Fig. 4, I have shown that the system may be utilized with a wheel or roller 18, without the characteristics thereof being, for this reason, modified in any way.

In Fig. 6, I have shown another arrangement of the shock absorber. In this embodiment, said shock absorber is placed between a point 19 of the upper arm and a fixed point 20 located in the lower part of the housing existing in the tail. The operation of the shock absorber remains the same.

In a likewise manner, in Fig. 7, the shock absorber is disposed between the end 21 of arm 13, which is prolonged for this purpose, and a fixed point 22.

Whatever be the position of the shock absorber, and whatever be the type thereof, its operation is independent of the direction in which the skid or wheel is turned and its elements are not subjected to any bending or torsional stresses, the function of this shock absorber being merely to brake the displacement of a given point of the lever in an upward or downward direction.

The system of the present invention as above described has many advantages the chief of which are the following:

1. As above explained, the tail skid or wheel can turn freely in any direction, the tube that carries said skid or wheel being capable of turning freely in its collars without this movement being transmitted to any degree to the shock absorber.

2. The rotation of the skid or wheel is not limited by the presence of any parts interfering with its movements.

3. Owing to the manner of mounting the tube that carries the skid or wheel by means of the two arms above mentioned, said tube moves, when the skid or wheel strikes obstacles, substantially parallelly to itself, and these displacements are braked by the shock absorber, which is subjected only to compression stresses but not bending or twisting stresses. The piston of the shock absorber never undergoes efforts tending to cause it to rotate or to wedge in the body of the cylinder of the shock absorber.

4. The position of the arms is such that both of them are subjected to stresses tending to elongate them, which is certainly the best way of utilizing mechanical pieces.

Owing to these various characteristics, the device according to the present invention is extremely simple and strong although its weight is very light. This system protects fully the shock absorber against any effort other than that normally necessary for absorbing and deadening shocks, whatever be the effort acting upon the skid or wheel, and whatever be the direction in which said skid or wheel is turned.

These considerations permit of lightening the shock absorber and of making use of shock absorbers of any kind.

Furthermore, the device includes no sliding element, since all the movements take place around pivoting axes. Besides, with the arrangement according to the invention, the shock absorber can be placed inside the airplane tail in such manner as to be always protected against dust and dirt, which further improves its working.

Finally, the tube carrying the skid or wheel makes a substantially constant angle with the vertical direction, which permits of eliminating nosing movements, which it is necessary to avoid and which occur frequently when the inclination of the pivot tube changes either as a consequence of pivoting movements thereof, or as a consequence of its displacements in the vertical direction caused by bumps in the ground.

The deadening of the shocks may be obtained through any device or system other than shock absorber 10 shown by way of example in the appended drawings.

In a likewise manner, the system according to the present invention can be applied to other structures than airplanes, the invention bearing upon the system in a general manner, whatever be the application thereof.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an airplane having a body, a tail supporting device which comprises, in combination, a part adapted to run on the ground, a cylindrical member supporting said part, housed in said body and projecting downwardly therefrom, two annular supports for said cylindrical member adapted to cooperate with respective upper and lower portions thereof, said supports being arranged to permit rotation but to prevent axial sliding displacements of said member in said annular supports, two arms, both pivoted at one end to said supports respectively about parallel horizontal axes, said arms being pivoted at their other respective ends to said airplane body about axes parallel to the first mentioned ones and located on opposite sides of said cylindrical member, and a shock absorber interposed between a fixed point of said airplane body and a point of one of these arms so as to transmit the weight of said airplane tail to said part adapted to run on the ground.

2. In an airplane having a body, a tail supporting device which comprises, in combination, a part adapted to run on the ground, a tube supporting said part, partly housed in said body and projecting downwardly therefrom, two collars coaxially surrounding respective upper and lower portions of said tube, said collars being arranged to permit rotation but to prevent axial sliding displacement of said tube in said collars, two arms, both pivoted at one end to said collars respectively about horizontal axes at right angles to the fore and aft direction of the airplane, said arms being pivoted at their other respective ends to said airplane body about axes parallel to said horizontal axes and located one on the front and the other on the rear of said tube, and a shock absorber interposed between a fixed point of said airplane body and a point of one of said arms so as to transmit the weight of said airplane tail to said part adapted to run on the ground.

3. In an airplane having a body, a tail supporting device which comprises, in combination, a part adapted to run on the ground, a tube supporting said part, partly housed in said body and projecting downwardly therefrom, two collars coaxially surrounding respective lower and upper portions of said tube, said collars being arranged to permit rotation but to prevent axial sliding displacement of said tube in said collars, two arms, both pivoted at one end to said collars respectively about horizontal axes at right angles to the fore and aft direction of the airplane, the arm pivoted to the lower collar being further pivoted at the other end to said airplane body about an axis parallel to said horizontal axes and located on the front of said tube, the other arm, pivoted to the upper collar, being further pivoted at its other end to said airplane body about an axis parallel to said horizontal axes and located on the rear of said tube, and a shock absorber interposed between a fixed point of said airplane body and a point of one of said arms so as to transmit the weight of said airplane tail to said part adapted to run on the ground.

4. A device according to claim 2 in which one of said arms is prolonged beyond said collar, said shock absorber being interposed between said prolonged part of said last mentioned arm and a fixed point of the airplane body.

RAYMOND SAULNIER.